Nov. 28, 1967  W. D. BROWN  3,355,220
CONCRETE VALVE STRUCTURE
Filed March 17, 1966  4 Sheets-Sheet 1
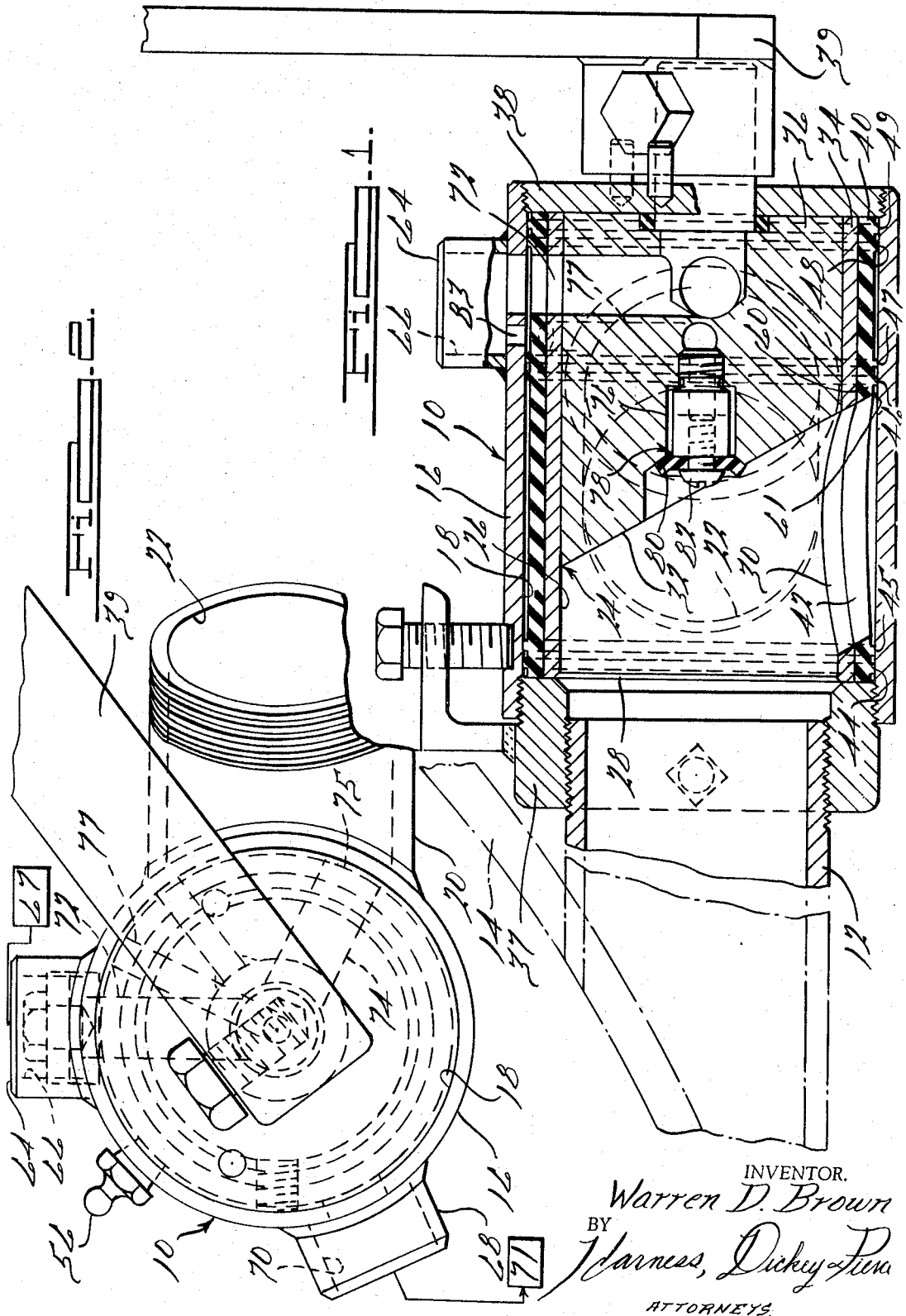
INVENTOR.
Warren D. Brown
BY
Harness, Dickey & Pierce
ATTORNEYS.

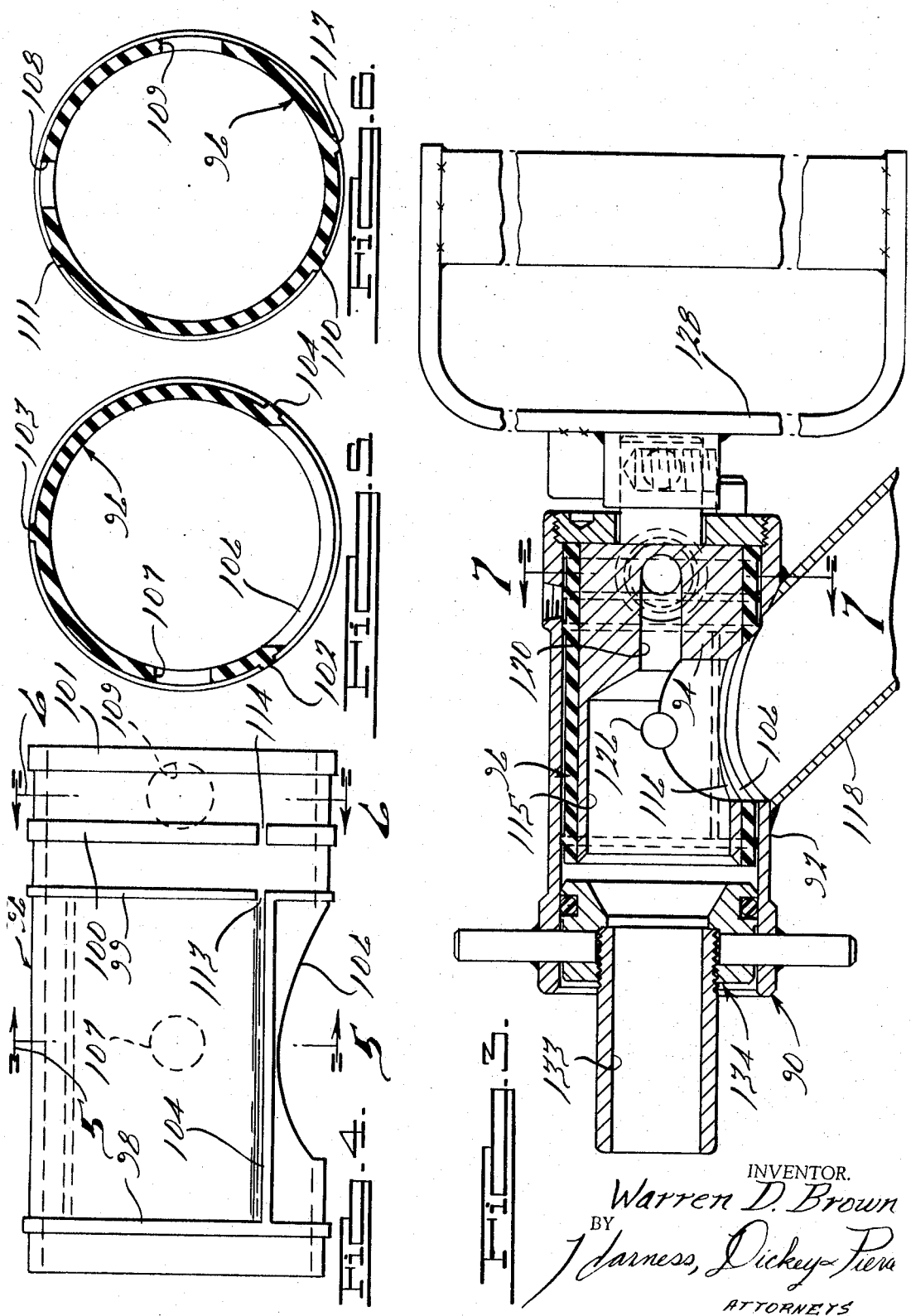

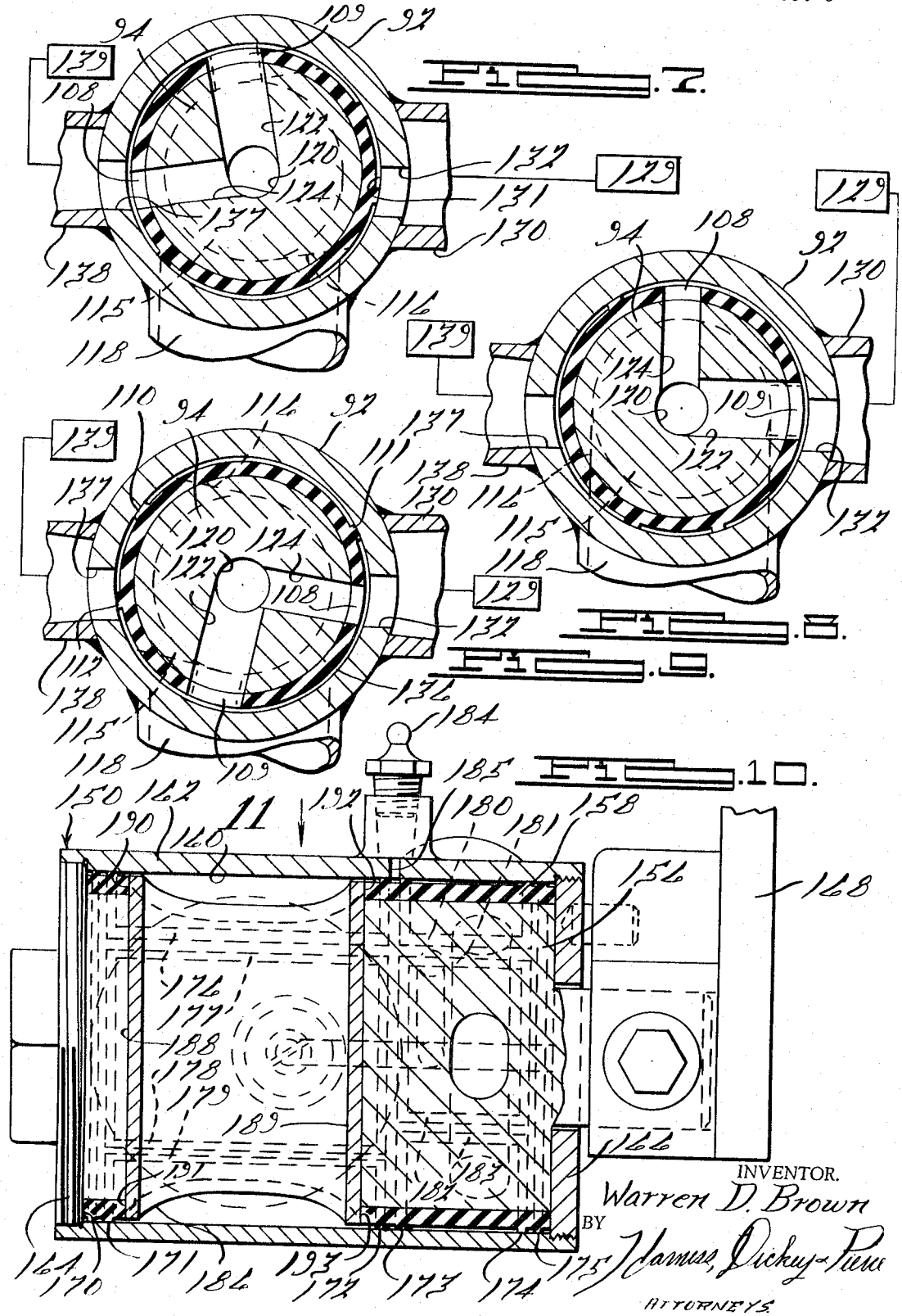

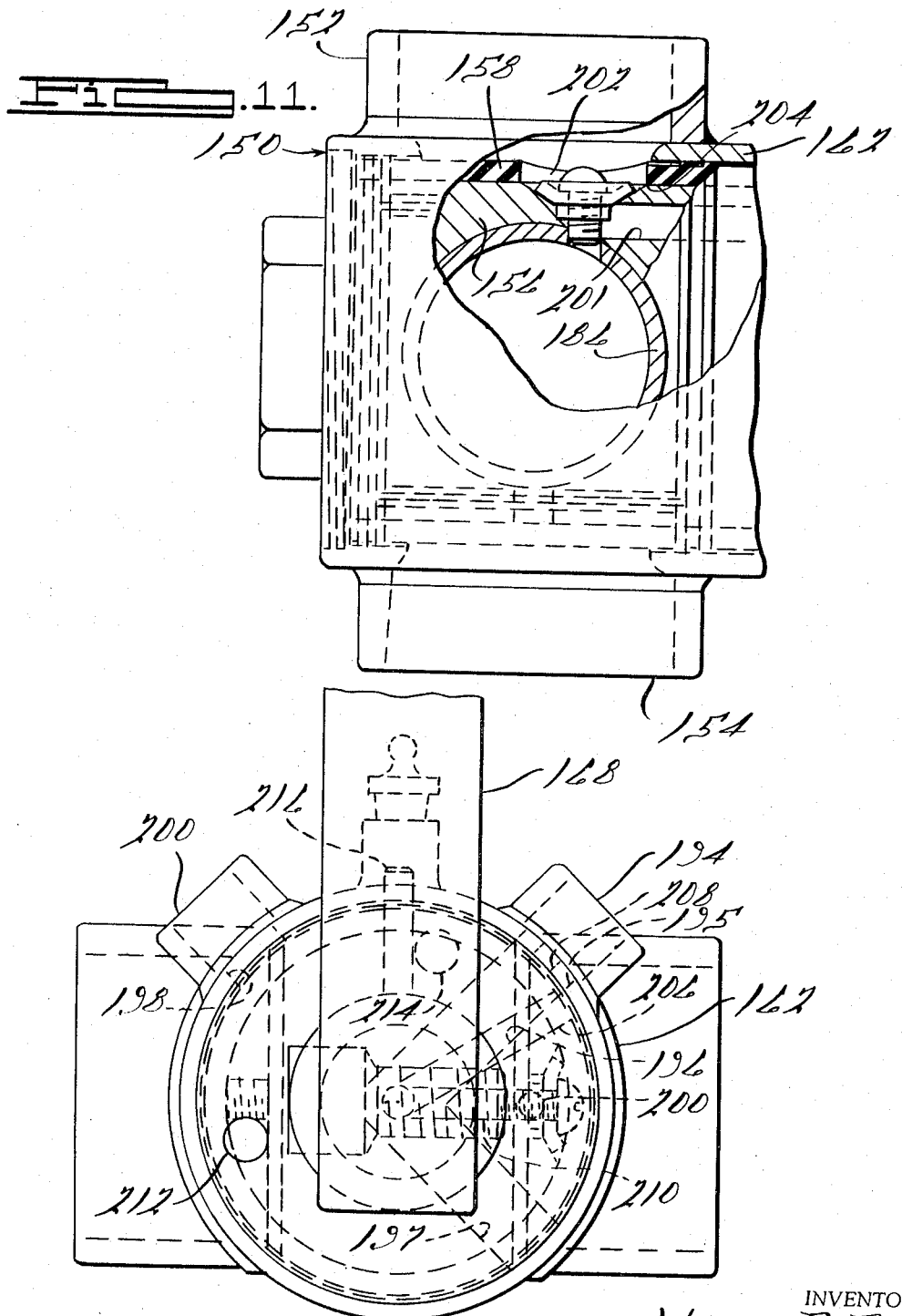

United States Patent Office 3,355,220
Patented Nov. 28, 1967

3,355,220
CONCRETE VALVE STRUCTURE
Warren Durand Brown, 6328 Dakota Circle,
Birmingham, Mich. 48010
Filed Mar. 17, 1966, Ser. No. 535,193
20 Claims. (Cl. 302—36)

ABSTRACT OF THE DISCLOSURE

There is herein disclosed a valve assembly comprising a valve housing and a rotatable cylindrical valve core including a replaceable wear liner in the form of a cylindrical sleeve of molded rubber or the like.

This invention relates to flow control apparatus, and more particularly, to flow control apparatus for use with flowing cementitious materials having relatively coarse granular constituents which subject parts in the flow path to abrasive wear and tear.

It is an object of this invention to provide new and improved flow control means having improved wear characteristics for use with cementitious materials and the like.

Another object is to provide a multi-purpose flow control valve with which adjunct operations may be performed by manipulation of a single operating mechanism. A related object is to provide a flow control valve with which such adjunct operations may be performed simultaneously with the flow control operations.

Referring now to the drawings,

FIG. 1 is a side elevational view, partly in section, of flow control means embodying certain features of the invention;

FIG. 2 is an end view of the apparatus shown in FIG. 1;

FIG. 3 is a side elevational view, partly in section, of another form of the invention;

FIG. 4 is a side elevational view of a part of the apparatus shown in FIG. 3;

FIG. 5 is a sectional view of the part shown in FIG. 4 taken along the line 5—5;

FIG. 6 is a sectional view of the part shown in FIG. 4 taken along the line 6—6;

FIG. 7 is a partial end view of the apparatus of FIG. 4 in a first operational position;

FIG. 8 is another partial end view of the apparatus of FIG. 4 in a second operational position;

FIG. 9 is another partial end view of the apparatus of FIG. 4 in a third operational position;

FIG. 10 is a side elevational view, partly in section, of another form of the invention;

FIG. 11 is an end view, partly in section, of the apparatus of FIG. 10; and

FIG. 12 is another end view of the apparatus of FIG. 10.

In general this invention is directed to flow control means in the form of a valve slidably supported in a valve housing for movement between closed and open flow positions relative to a flow passage. In the broadest aspects of this invention, it is contemplated that the sliding valve movement may take various forms such as rotary, pivotal, or linear. Furthermore, it is also contemplated that the relatively moving parts may be variously arranged and positioned.

Referring now to FIGS. 1 and 2, one embodiment of certain features of the invention comprises a valve assembly 10 mounted on an outlet pipe 12 of a material mixing or supply tank 14 of the general type disclosed in my prior U.S. Patent 3,212,759.

The valve assembly comprises an open ended tubular valve housing 16 having an axially extending cylindrical passage 18 and a transverse generally radially opening tubular outlet conduit 20 providing a cylindrical outlet passage 22. The central longitudinal axis of tubular housing 16 and passage 18 intersects the central longitudinal axis of outlet tube 20 and passage 22 at an angle of approximately 45°.

A rotatable cylindrical valve core assembly 24 is rotatably mounted in the tubular housing 16 and includes an axially extending cylindrical flow passage 26 having an inlet opening 28 communicating with tank outlet pipe 12 and a transverse outlet opening 30 corresponding to and communicable with the cylindrical outlet passage 22 in an open position of the valve core assembly. A material deflecting surface 32 extends generally transversely across and terminates flow passage 26 and has a curvilinear contour corresponding to and forming a continuation of outlet passage 22 and opening 30 in the open position. In one form of the invention, the valve core assembly is formed in two parts and includes a replaceable wear liner 34 in the form of a cylindrical sleeve fixedly mounted in any suitable manner on a cylindrical core member 36. The valve core assembly is axially confined by suitable end plates 37, 38. An operating handle 39 is suitably attached to the valve core assembly for rotation of the valve core assembly within housing 16 as described hereinafter in further detail.

A protective covering in the form of a rubber-like liner or sleeve 40 is suitably fixedly mounted on the valve core assembly, as by being molded thereon or by cementing with an epoxy resin, between the wear liner 34 and the housing 16. Sleeve 40 rotates with the valve core assembly relative to the housing 16 and is provided with a transverse outlet opening 42 corresponding to outlet opening 30 and outlet passage 22. The sleeve 40 is preferably made of molded rubber having relatively high abrasion and high tensile resistance characteristics. The rubber material may also contain some lubricating substance such as graphite to promote rotational movement. The sleeve 40 has a plurality of circumferentially extending radially outwardly protruding axially spaced cylindrical ribs 44, 45, 46, 47, 48, 49 which are of a diametrical size sufficient to provide an interference fit of approximately .010 to .020 inch with the inner cylindrical surface of the housing 16. The width of the ribs may be, for example, approximately .06 inch and the height of the radial projection of the ribs may be approximately .01 to .03 inch. Axially extending circumferentially spaced ribs (not shown in FIG. 1 but illustrated in FIG. 10) of similar size extend between ribs 45, 46 so as to enclose the outlet openings 30, 42. A relatively hard rubber stock of approximately 90 durometer is preferable so the ribs are under considerable compression in sealing wiping contact with the inner surface of the housing. Thus, the rib surfaces in contact with the housing support the rubber-like liner 40 on only a minor portion of the entire outer peripheral surface of the liner. The valley areas between the ribs are of reduced diametrical size relative to the ribs and constitute a major portion of the entire outer peripheral surface so as to allow relatively friction free sliding movement between the valley areas and the housing. It has been determined that the valley areas should, preferably, have a diametrical size slightly less than the diametrical size of the inner cylindrical surface 18 of the housing.

A lubricating fitting 56, FIG. 2, extends through housing 10 in communication with the valley areas on the rubber sleeve. Lubricant grooves (not shown in FIG. 1 but illustrated in FIGS. 3–6 and 10) may be formed by the ribs to enable a coating of grease to be applied between the rubber sleeve and the inner wall of the housing 16.

The valley portion 60 of the rubber liner 40 surrounding the outlet port 30 in the housing provides a wiping edge 61 which, during rotation of the core assembly, wipes away coarse granular particles or pebbles found in the material being handled and remaining on the housing wall and prevents such particles from becoming wedged between the housing and the valve core assembly. The compression sealed ribs surrounding the outlet port 42 easily wipe away fine particles of sand or cement as well as liquids and gases which may be missed by the edge 61. Thus, the wearing characteristics of the mating metal surfaces of the housing and of the core assembly are greatly improved and the rubber liner also has long life. The wear which does occur is taken up by the rubber liner and it may be stripped from the core assembly and replaced as necessary.

In operation, it may be noted that rotation of handle 39 causes rotation of the core assembly 24 including the attached rubber liner 40 so that the aligned outlet ports 30 and 42 may be selectively brought into and out of alignment with outlet passage 22. In this manner, a shearing type cut-off is provided which is particularly advantageous in use with flowing abrasive materials.

While, in the illustrative embodiment heretofore described, compressive engagement between the ribs and the housing is obtained by making the ribs oversize relative to the inside diameter of the housing, it is contemplated that the desired compression relationship might also be obtained by providing an axially tapering rubber sleeve or core and axially compressing the rubber sleeve by a tightening nut or the like to cause radial expansion until the desired degree of rib compression was obtained.

Another feature of the present invention involves the provision of a valve assembly for use in conveyance of cementitious materials or the like in which both the flow of cementitious materials in a flow line and adjunct operations such as injection of air in the flow line to promote flow can be controlled simultaneously by actuation of a single mechanism.

Referring again to FIGS. 1 and 2, an air inlet nipple 64 having an air inlet passage 66 extends radially from housing 16 at a location spaced axially and circumferentially from the material outlet 20. The air inlet nipple is connected to a source of high pressure air 67 in a conventional manner. An air outlet nipple 68 having an air outlet passage 70 extends radially from housing 16 at a location spaced circumferentially from the air inlet 64 and the material outlet 20. The air outlet is connected to air operable control apparatus 71 or air dispersion means in the flow passage or the like. Core 36 and rubber sleeve 40 are provided with radially extending intersecting passages 72, 74 which are circumferentially spaced and located relative to outlet ports 30, 42 so as to communicate with the air inlet 66 and outlet 70 when the core is rotated to the open position (not shown) whereat the outlet ports 30, 42 communicate with discharge passage 22. In the open position, passage 72 is aligned with passage 70 and passage 74 is aligned with passage 66. Conversely, when the core is rotated to a closed position as shown in FIGS. 1 and 2, communication between the air inlet and outlet ports 66, 70 is also terminated with passage 74 being blocked by the inner wall of the housing as at 75, FIG. 2.

Another feature of the invention resides in the provision of means to blow back cementitious materials from the valve assembly 10 toward the tank outlet 12. Referring again to FIGS. 1 and 2, the core is provided with an axially extending air passage 76 communicating at one end with a radially extending air inlet passage 77 and communicating with the material flow passage 26 at the other end. A valve assembly 78 comprising a one-way rubber flap valve 80 and supporting stud means 82 is mounted in the air passage 76 to enable flow of high pressure air from the air inlet 66 to the material passage 26 while preventing reverse flow of cementitious materials into the air passage 76. The radially extending air inlet passage 77 in the core terminates at the periphery of the core in circumferentially spaced relationship to the air passages 72, 74 and the material outlet passage 22 so as to be connectible to the air inlet 66 through a port 83 at a third rotational position (not shown) of the core other than the previously described open and closed positions. This blow back position is attainable by rotating the handle and core counterclockwise, as viewed in FIG. 2, until passage 72 is moved by inlet 66 and passage 77 is aligned with port 83. In this manner, high pressure air may be selectively directed to the interior of the valve assembly to create a blow back pressure which, for example, may be used to blow back into a mixing tank any unmixed or partially mixed or mixed sand or cement or the like which might form a hard non-flowable obstruction in the valve assembly or tank outlet if allowed to remain therein.

Another embodiment of certain features of the present invention is shown in FIGS. 3, 4, 5, 6, 7, 8, and 9 wherein a multi-function valve assembly of the general type heretofore described is shown in association with a spray gun assembly 90 utilized at the end of a conveying hose or the like for use, for example, in concrete and mortar spraying operations. Referring now to FIG. 3, a valve housing 92 rotatably supports a valve core 94 having a ribbed rubber sleeve 96 attached thereto as hereinbefore described.

As shown in FIGS. 3–6, sleeve 96 comprises a plurality of axially spaced circumferentially extending ribs 98, 99, 100, 101. A plurality of circumferentially spaced axially extending ribs 102, 103, 104 extend between ribs 98, 99 with ribs 102, 104 being spaced on opposite sides of a material inlet opening 106 and, in conjunction with portions of ribs 98, 99, surrounding the opening 106. A similar arrangement is provided on the rubber sleeve 40 of the embodiment of FIGS. 1 and 2. Ribs 102 and 103 are located on opposite sides of an air inlet opening 107. Rib 103 is spaced equidistant between ribs 102 and 104. Axially aligned air ports 108, 109 are spaced between ribs 100 and 101. Additional axially extending circumferentially spaced ribs 110, 111, 112 extend between ribs 100, 101 to define a circumferentially extending air passage between ribs 00 and 101 during certain operations as will be more fully explained hereinafter. Lubricant grooves 113, 114 are suitably placed to enable the rubber sleeve to be lubricated through a lubricating fitting (not shown) as hereinbefore described with reference to FIGS. 1 and 2.

It may be noted that valve core 94 of FIG. 3 is a one-piece member having an axially extending material discharge passageway 115 and a transverse generally radially extending material inlet passage 116 communicating with a material supply hose attaching conduit 118. An axially extending passage 120 opens at the rear of the passage 115 and terminates in radially extending air inlet passages 122, 124 (FIGS. 7–9) which are axially and circumferentially aligned with ports 108, 109 in the rubber sleeve. A blow back air port 126 extends radially from discharge chamber 115 and is axially and circumferentially aligned with port 107 in the rubber sleeve. Ports 107 and 126 are axially aligned with conduit 118 and are movable into communication therewith as hereinafter described in detail.

A control handle 128 is attached to the core 94 to allow a spray operator to rotate the inlet passages 106, 116 between open and closed positions relative to the supply conduit 118. At the same time that the material inlet openings in the core are rotated between the open and closed positions, a source of high pressure air 129 connected to an air supply conduit 130, FIGS. 7–9, is connected and disconnected relative to air inlet passage 120. In the closed position of FIG. 7, air inlet port 132 of air supply conduit 130 is closed by the core and sleeve as indicated at 131. In the open position, shown in FIG. 8, high pressure air enters the rear of the material passage 115 via passages 120, 122 and ports 109, 132 to spray the material axially outwardly through a discharge passage 133 in a nozzle tip assembly 134 of conventional design. The core is also rotatable to a blow back position, FIG. 9, in which the air inlet conduit 130 is connected to flow chamber 115 by radially extending passage 124 and axially extending passage 120. Flow chamber 115 is connected by reduced diameter ports 107, 126 to material supply conduit 118. By blocking nozzle passage 133, the operator is able to cause the high pressure air to be directed into the material supply line 118 through ports 107, 126 to force material to blow back through the supply conduit toward the supply tank. In order to relieve the pressure at the supply tank and enable the blow back operation, in the blow back position, air supply conduit 130 is also connected around the periphery of the valve core sleeve 96 via a passage 136, FIG. 9, between ribs 100, 101 to a port 137 communicating with an air return conduit 138 to operate an air cylinder or valve or the like 139 at the supply tank to relieve high pressure at the tank forcing the material through the supply conduit 118. Passage 136 is closed in the other positions of the core by the axially extending ribs 110, 111, 112.

Referring now to FIGS. 10, 11, and 12, certain features of the invention are shown in an illustrative embodiment to comprise a valve assembly 150 having oppositely located material inlet and outlet passages 152, 154, FIG. 11. A rotatable valve core 156 having a rubber-like sleeve 158 molded thereon is rotatably supported by a cylindrical support surface 160 of a valve housing 162. End plates 164, 166 axially locate the core in the housing. A control handle 168 is attached to one end of the core.

Sleeve 158 is provided with pairs of axially spaced circumferentially extending ribs 170, 171 and 172, 173 and 174, 175. Pairs of circumferentially spaced axially extending ribs 176, 177 and 178, 179 and 180, 181 and 182, 183 interconnect the circumferentially extending ribs and define lubricant passages therebetween. A lubricant fitting 184 is connected by a passage 185 to one of the lubricant passages so that a lubricant such as grease may be applied throughout. The lubricant is applied with low pressure with the core in the open position so that the lubricant will remain in and flow throughout the lubricant grooves and not be forced over the ribs. It will be understood that additional pairs of axially extending ribs are located opposite the ribs 176–183. Thus, the ribs 171, 172, and 176, 179 with their oppositely located counterparts, enclose the material flow ports in the rubber-like sleeve 158. In this embodiment, the ribs have a width of approximately .08 inch and protrude radially approximately .015 inch beyond the flat valley portions of the rubber-like sleeve therebetween which has an outside diameter of approximately 3⅛ inches and a length of approximately 4¼ inches. Thus, it will be seen that the housing surface contacting outer surfaces of the ribs provide only a minor portion of the total outside peripheral surface area of the sleeve while the valley areas provide the major portion of that area.

In order to protect the wiping edges of the rubber-like sleeve 158 from shear forces imposed during flow of cementitious materials through the valve, an open ended metallic cylindrical sleeve 186 is advantageously mounted in a transverse passage 188 extending through core 158 to provide a flow passage 189. The ends of the sleeve are cylindrically contoured so as to correspond to the valve housing cylindrical inner wall 160 and overlap the adjacent side edges of the rubber-like sleeve as indicated at 190, 191, 192, 193. When the core is rotated from the open flow position, with the flow passage 189 aligned with inlet and outlet passages 152, 154, to the closed position, relatively large abrasive particles flowing through the valve under pressure are prevented from contacting the rubber sleeve. Relatively small particles, i.e. .025 inch or less, which may enter the space between the core and the housing adjacent the inlet and outlet openings will be wiped away by the molded sealing ridges as previously described.

As shown in FIG. 12, flow of high pressure air through an air inlet passage 194 and port 195 in valve housing 162 is simultaneously controlled by the rotatable core. Radially extending intersecting air passages 196, 197 are arranged as hereinbefore described with reference to FIGS. 1 and 2. When the handle 168 is rotated counterclockwise, as viewed in FIG. 12, passage 196 is brought into alignment with air outlet port 198 and passage 200 which is suitably connected to an air operable control device or the like as previously described in connection with FIGS. 1 and 2. Passage 197 is aligned with air inlet port 195 and passage 194 so that high pressure air is delivered to port 198 and passage 200. Referring now to FIG. 11, an axially extending air passage 201 in core 156 terminates in a valve assembly 202 mounted in a transversely opening valve seat 204. A radially extending passage 206 is connectible to the air inlet 194 through a port 208. Another radially extending passage 210 connects passage 206 to passage 200. Thus, in a closed position of the valve core, high pressure air may be directed into the material inlet 152 through valve 202 for a blow back operation as previously described. The rotational movement of the valve core may be limited by suitable stops 212, 214 and an abutment 216 on the handle.

Since the features of the present invention may be variously embodied and utilized, it is intended that the scope of the subjoined claims be construed to include alternative arrangements except insofar as limited by the prior art.

What is claimed is:

1. Apparatus for controlling the flow of cementitious materials or the like from a source of supply to discharge means comprising:
   conduit means defining a material flow path extending from and communicating with said source of supply to receive and carry material from said source of supply to said discharge means;
   valve means in said conduit means in said flow path to selectively permit and prevent flow of material from said source of supply to said discharge means;
   said valve means comprising:
      a valve housing having material inlet and outlet openings,
      a movable valve core slidably mounted in said valve housing between said openings and being movable therein between a closed position preventing flow of material through said conduit means and an open position permitting flow of material through said conduit means,
      said valve core having at least one surface slidably supported in said valve housing,
      said valve core being movable transversely to the flow path of material moving through said conduit means from said inlet opening to said outlet opening, said surface being located for transverse shearing movement through material flowing through said conduit means, a rubber-like protective covering positioned between said surface and said housing and slidably supporting said valve core relative to said housing, rib means projecting outwardly on said protective covering and providing support surfaces between said valve core and said valve housing, the support surfaces of said rib means forming wiping edges and comprising a minor portion of the total surface area between said valve core and said valve housing, said rib means defining valley areas between said rib means comprising a major portion of the total surface area between said valve core and said valve housing, said rib means being under stress by compression between said valve core and said valve housing, and said valley areas being relatively unstressed and spaced inwardly from said wiping surfaces and being relatively friction free during sliding movement of said valve core relative to said housing, an air inlet to said valve housing and an air outlet from said valve housing, and said movable valve core being slidably mounted between said air inlet and said air outlet and being movable between a closed position preventing flow of air through said valve housing and an open position permitting flow of air through said valve housing, said valve core being simultaneously movable between said closed position preventing flow of material through said conduit means and said open position permitting flow of material through said conduit means.

2. The invention as defined in claim 1 and having air passage means in said valve core having an opening at one end in alignment with said air inlet and an opening at another end in alignment with said material inlet opening, and the openings of said air passage means being spaced on said valve core to connect said air inlet to said material inlet opening in a closed position preventing flow of material through said conduit means so as to provide blow back means for blowing back material in said material inlet.

3. The invention as defined in claim 2 and having an air operable device for controlling flow of material to said material inlet, and additional air passage means connected to said air operable device and being connected to said air inlet by said valve core during blow back.

4. The invention as defined in claim 1 and wherein said valve housing being cylindrical and said movable valve core being cylindrical, said one surface being cylindrical, and said rubber-like protective covering being cylindrical.

5. The invention as defined in claim 4 and said valve core being rotatably supported by said valve housing.

6. The invention as defined in claim 5 and having a single operating device connected to said valve core for causing rotating movement between the open and closed positions.

7. The invention as defined in claim 4 and said rib means comprising a plurality of axially spaced circumferentially extending ribs and a plurality of axially extending circumferentially spaced ribs, said ribs enclosing said material inlet in the open position permitting flow of material through said conduit means and providing wiping edges effective during movement of said valve core to wipe away material on said valve housing.

8. The invention as defined in claim 7 and having valley areas between the ribs enclosing said material inlet and providing additional wiping edges.

9. The invention as defined in claim 8 and having a wear resistant liner adjacent said additional wiping edges.

10. The invention as defined in claim 7 and said ribs being formed in closely spaced pairs providing lubrication grooves therebetween, and lubrication passage means in said valve housing connected to said grooves for supplying lubrication thereto.

11. The invention as defined in claim and having an axially extending cylindrical valve housing, an axially extending cylindrical valve core rotatably mounted in said valve housing, a rubber-like axially extending cylindrical protective sleeve fixedly mounted on said valve core and extending the length thereof, an axially extending material inlet passage in said valve core and being connected at one end of said valve housing to a material supply opening, a transverse material outlet opening extending through said valve housing intermediate the ends thereof, axially and circumferentially aligned transverse material outlet openings in said valve core and said protective sleeve axially aligned with and being rotatable into and out of circumferential alignment with said transverse material outlet opening extending through said valve housing, transverse axially aligned and circumferentially spaced air inlet and outlet openings extending through said valve housing intermediate the ends thereof and being axially spaced from said material inlet passage and said material outlet openings, axially aligned and circumferentially spaced air passage means in said valve core and said protective sleeve axially aligned with and being rotatable into and out of circumferential alignment with said transverse air inlet and air outer openings, and manually operable actuating means connected to said valve core to variously rotatably position said valve core and simultaneously connect and disconnect said material inlet opening and said material outlet opening and connect and disconnect said air inlet and said air outlet openings.

12. The invention as defined in claim 1 and having an axially extending cylindrical valve housing, an axially extending cylindrical valve core rotatably mounted in said valve housing, a rubber-like axially extending cylindrical sleeve fixedly mounted on said valve core and extending the length thereof and rotatably supporting said valve core on and in spaced relationship to said valve housing, an axially extending material outlet passage in said valve core and being connected at one end of said valve housing to a material discharge opening, a transverse material inlet opening extending through said valve housing intermediate the ends thereof, axially and circumferentially aligned transverse material inlet openings in said valve core and said protective sleeve axially aligned with and being rotatable into and out of circumferential alignment with said transverse material inlet opening extending through sad valve housig, transverse axially aligned and circumferentially spaced air inlet and air outlet openings extending through said valve housing intermediate the ends thereof and being axially spaced from said material inlet opening, axially aligned and circumferentially spaced air passage means in said valve core and said protective sleeve axially aligned with and being rotatable into and out of circumferential alignment with said transverse air inlet and outlet openings, and a single actuating means connected to said valve core to variously rotatably position said valve core and simultaneously connect and disconnect said material inlet openings and said material outlet opening and connect and disconnect said air inlet and said air outlet openings.

13. The invention as defined in claim 12 and having axially extending air passage means connecting said air inlet to said material outlet passage when said material inlet openings are circumferentially aligned.

14. The invention as defined in claim 13 and having blow back means comprising a blow back air port axially aligned with and circumferentially spaced from said material inlet openings in said valve core and said protective sleeve, and said blow back air port being circumferentially aligned with said material inlet opening extending through said valve housing when said material inlet openings in said valve core and said protective sleeve are circumferentially spaced from said material inlet opening in said valve housing with said axially extending air passage means being connected to said air inlet opening.

15. The invention as defined in claim 1 and having
an axially extending cylindrical valve housing,
an axially extending cylindrical valve core rotatably mounted in said valve housing,
a rubber-like axially extending cylindrical sleeve fixedly mounted on said valve core and extending the length thereof and rotatably supporting said valve core on and in spaced relationship to said valve housing,
axially aligned and circumferentially spaced material inlet and outlet openings extending through said valve housing intermediate the ends thereof,
transversely extending material flow passage means in said valve core and said protective sleeve axially aligned with and being rotatable into and out of circumferential alignment with said material inlet and outlet openings,
transverse axially aligned and circumferentially spaced air inlet and air outlet openings extending through said valve housing intermediate the ends thereof and being axially spaced from said material inlet opening,
axially aligned and circumferentially spaced air passage means in said valve core and said protective sleeve axially aligned with and being rotatable into and out of circumferential alignment with said transverse air inlet and outlet openings,
and a single operating means connected to said valve core to variously rotatably position said valve core and simultaneously connect and disconnect said material inlet and outlet openings and connect and disconnect said air inlet and outlet openings.

16. The invention as defined in claim 15 and having a metallic liner mounted in said flow passage and having portions extending over said sleeve between said valve core and said valve housing.

17. Apparatus for controlling the flow of cementitious materials or the like from a source of supply to discharge means comprising:
conduit means defining a material flow path extending from and communicating with said source of supply to receive and carry matreial from said source of supply to said discharge means;
valve means in said conduit means in said flow path to selectively permit and prevent flow of material from said source of supply to said discharge means; said valve means comprising:
a valve housing having material inlet and outlet openings,
a movable valve core slidably mounted in said valve housing between said openings and being movable therein between a closed position preventing flow of material through said conduit means and an open position permitting flow of material through said conduit means,
said valve core having at least one surface slidably supported in said valve housing,
said valve core being movable transversely to the flow path of material moving through said conduit means from said inlet opening to said outlet opening,
said surface being located for transverse shearing movement through material flowing through said conduit means, and
a rubber-like protective covering positioned between said surface and said housing and slidably supporting said valve core relative to said housing,
an air inlet to said valve housing and an air outlet from said valve housing,
and said movable valve core being slidably mounted between said air inlet and said air outlet and being movable between a closed position preventing flow of air through said valve housing and an open position permitting flow of air through said valve housing,
said valve core being simultaneously movable between said closed position preventing flow of material through said conduit means and said open position permitting flow of material through said conduit means.

18. The invention as defined in claim 17 and having
an axially extending cylindrical valve housing,
an axially extending cylindrical valve core rotatably mounted in said valve housing,
a rubber-like axially extending cylindrical protective sleeve fixedly mounted on said valve core and extending the length thereof,
an axially extending matreial inlet passage in said valve core and being connected at one end of said valve housing to a material supply opening,
a transverse material outlet opening extending through said valve housing intermediate the ends thereof,
axially and circumferentially aligned transverse material outlet openings in said valve core and said protective sleve axially aligned with and being rotatable into and out of circumferential alignment with said transverse material outlet opening extending through said valve housing, and
transverse axially aligned and circumferentially spaced air inlet and outlet openings extending through said valve housing intermediate the ends thereof and being axially spaced from said material inlet passage and said material outlet openings.

19. The invention as defined in claim 17 and having
an axially extending cylindrical valve housing,
an axially extending cylindrical valve core rotatably mounted in said valve housing,
a rubber-like axially extending cylindrical sleeve fixedly mounted on said valve core and extending the length thereof and rotatably supporting said valve core on and in spaced relationship to said valve housing,
an axially extending material outlet passage in said valve core and being connected at one end of said valve housing to a material discharge opening,
a transverse material inlet opening extending through said valve housing intermediate the ends thereof,
axially and circumferentially aligned transverse material inlet opening openings in said valve core and said protective sleeve axially aligned with and being rotatable into and out of circumferential alignment with said transverse material inlet opening extending through said valve housing, and
transverse axially aligned and circumferentially spaced air inlet and air outlet openings extending through said valve housing intermediate the ends thereof and being axially spaced said material inlet opening.

20. The invention as defined in claim 17 and having
an axially extending cylindrical valve housing,
an axially extending cylindrical valve core rotatably mounted in said valve housing,
a rubber-like axially extending cylindrical sleeve fixedly mounted on said valve core and extending the length thereof and rotatably supporting said valve core on and in spaced relationship to said valve housing, axially aligned and circumferentially spaced material inlet and outlet opening extending through said valve housing intermediate the ends thereof, transversely extending material flow passage means in said valve core and said protective sleeve axially ailgned with and being rotatable into and out of circumferential alignment with said material inlet and outlet openings, and transverse axially aligned and circumferentially spaced air inlet and air outlet openings extending through said valve housing intermediate the ends thereof and being axially spaced from said material inlet opening.

References Cited

UNITED STATES PATENTS

| | | | |
|---|---|---|---|
| 2,367,647 | 1/1945 | Mott | 302—36 |
| 3,146,286 | 8/1964 | Freed | 251—317 |
| 3,186,436 | 6/1965 | Modrin | 251—317 |
| 3,235,134 | 2/1966 | Frye | 222—193 |
| 3,280,835 | 10/1966 | Hill et al. | 136—246.12 |

ANDRES H. NIELSEN, *Primary Examiner.*